United States Patent
Ahn et al.

(10) Patent No.: US 10,263,915 B2
(45) Date of Patent: Apr. 16, 2019

(54) METHOD FOR PROCESSING EVENT BETWEEN CONTROLLER AND NETWORK DEVICE

(71) Applicant: KT Corporation, Seongnam-si (KR)

(72) Inventors: Tae Jin Ahn, Daejeon (KR); Se Hui Lee, Daejeon (KR); Kyung Ah Han, Daejeon (KR)

(73) Assignee: KT Corporation, Seongnam-si (KR)

( * ) Notice: Subject to any disclaimer, the term of this patent is extended or adjusted under 35 U.S.C. 154(b) by 37 days.

(21) Appl. No.: 15/100,495

(22) PCT Filed: Nov. 28, 2014

(86) PCT No.: PCT/KR2014/011539
§ 371 (c)(1),
(2) Date: May 31, 2016

(87) PCT Pub. No.: WO2015/080512
PCT Pub. Date: Jun. 4, 2015

(65) Prior Publication Data
US 2016/0308787 A1    Oct. 20, 2016

(30) Foreign Application Priority Data
Nov. 28, 2013  (KR) .......................... 10-2013-0146637

(51) Int. Cl.
*H04L 12/937* (2013.01)
*H04L 12/931* (2013.01)
(Continued)

(52) U.S. Cl.
CPC .......... *H04L 49/254* (2013.01); *H04L 43/026* (2013.01); *H04L 43/16* (2013.01);
(Continued)

(58) Field of Classification Search
CPC ... H04L 49/354; H04L 43/16; H04L 43/0876; H04L 43/0882; H04L 43/0888;
(Continued)

(56) References Cited

U.S. PATENT DOCUMENTS

| 739,368 A | * | 9/1903 | White | F16H 55/42 474/187 |
| 7,752,296 B2 | * | 7/2010 | Kim | H04L 67/125 709/203 |

(Continued)

FOREIGN PATENT DOCUMENTS

WO    2012/130264 A1    10/2012

OTHER PUBLICATIONS

Li Erran Li, et al., "Toward Software-Defined Cellular Networks", 2012 European Workshop on Software Defined Networking, IEEE, Oct. 26, 2012, pp. 7-12.
(Continued)

*Primary Examiner* — Warner Wong
(74) *Attorney, Agent, or Firm* — Sughrue Mion, PLLC

(57) ABSTRACT

A method for processing an event between a controller and a network device is disclosed. A method for processing an event in a network device comprises the steps of: receiving an event notification registration request from a controller; monitoring the occurrence of an event corresponding to the event notification registration request and; when an event occurs, notifying the event occurrence to the controller. Thus, the controller can reduce the load through reducing the number of times of message transmissions for monitoring the event by a switch.

23 Claims, 8 Drawing Sheets

(51) Int. Cl.
*H04L 12/26* (2006.01)
*H04L 12/24* (2006.01)

(52) U.S. Cl.
CPC .......... *H04L 49/00* (2013.01); *H04L 41/0604* (2013.01); *H04L 41/0609* (2013.01); *H04L 43/0829* (2013.01)

(58) Field of Classification Search
CPC .......... H04L 43/00; H04L 43/06; H04L 43/08; H04L 12/1863; H04L 2012/5636; H04L 41/00; H04L 41/06; H04L 41/0604; H04L 41/0609; H04L 41/0627; H04L 65/80
See application file for complete search history.

(56) References Cited

U.S. PATENT DOCUMENTS

| | | | | |
|---|---|---|---|---|
| 7,843,853 | B2* | 11/2010 | Lin | H04L 29/06027 370/255 |
| 7,966,365 | B2* | 6/2011 | Hernandez | H04L 12/24 709/202 |
| 8,104,037 | B2* | 1/2012 | Kim | H04L 43/16 718/102 |
| 8,490,100 | B2* | 7/2013 | Kim | H04L 43/16 709/201 |
| 2003/0126307 | A1* | 7/2003 | Lindner | G06F 9/465 719/318 |
| 2004/0158333 | A1* | 8/2004 | Ha | H04B 3/542 700/3 |
| 2004/0177143 | A1* | 9/2004 | Maciel | H04L 41/22 709/224 |
| 2006/0015626 | A1* | 1/2006 | Hallamaa | H04L 41/5054 709/229 |
| 2007/0018784 | A1* | 1/2007 | Yoon | H04L 12/2827 340/3.7 |
| 2007/0076625 | A1* | 4/2007 | Tahara | H04L 29/12028 370/252 |
| 2007/0174447 | A1* | 7/2007 | Kim | G06Q 10/06 709/223 |
| 2007/0174462 | A1* | 7/2007 | Kim | G06F 11/0709 709/226 |
| 2007/0261064 | A1* | 11/2007 | Jin | H04L 12/2803 719/318 |
| 2009/0113452 | A1* | 4/2009 | Grigsby | G06F 9/542 719/318 |
| 2009/0132589 | A1* | 5/2009 | Daos | H04L 43/0817 |
| 2012/0303835 | A1 | 11/2012 | Kempf et al. | |
| 2013/0058339 | A1 | 3/2013 | Casado et al. | |
| 2013/0151690 | A1* | 6/2013 | Shah | G06Q 10/10 709/224 |
| 2013/0194914 | A1 | 8/2013 | Agarwal et al. | |
| 2013/0246504 | A1* | 9/2013 | Hu | H04L 67/26 709/203 |
| 2014/0006612 | A1* | 1/2014 | Fallon | H04L 41/065 709/224 |
| 2014/0012983 | A1* | 1/2014 | Brown | H04L 43/08 709/224 |
| 2014/0078882 | A1* | 3/2014 | Maltz | H04L 41/0883 370/216 |
| 2014/0254367 | A1* | 9/2014 | Jeong | H04L 47/803 370/233 |
| 2017/0149816 | A1* | 5/2017 | Kelekar | H04L 63/1433 |
| 2017/0215303 | A1* | 7/2017 | Mick | H05K 7/20836 |

OTHER PUBLICATIONS

International Search Report for PCT/KR2014/011539 dated Mar. 26, 2015 [PCT/ISA/210].
Written Opinion for PCT/KR2014/011539 dated Mar. 26, 2015 [PCT/ISA/237].

* cited by examiner

FIG. 5

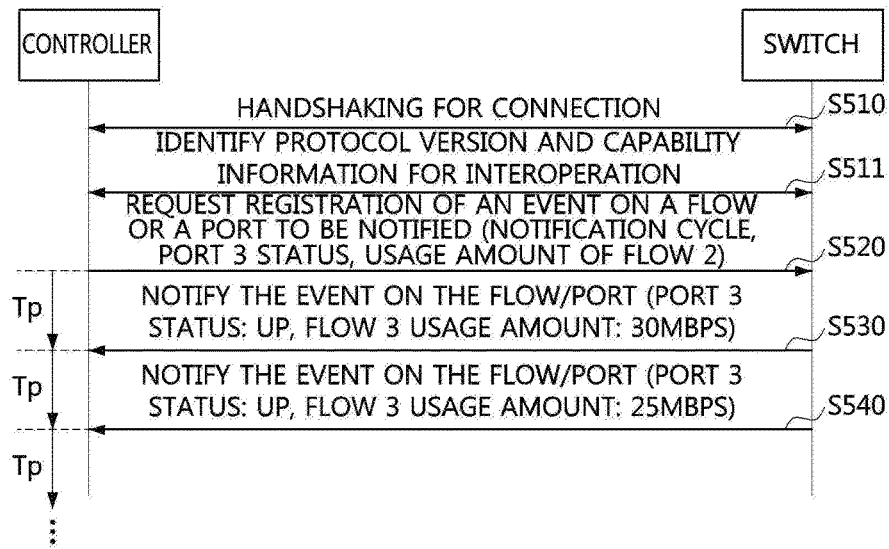

FIG. 6

| PARAMETER | EXPLANATION | REMARKS |
|---|---|---|
| MSG ID | EVENT REGISTRATION REQUEST MESSAGE IDENTIFIER | |
| CONTROLLER ID | IDENTIFIER OF A CONTROLLER REQUESTING EVENT REGISTRATION | |
| SWITCH ID | IDENTIFIER OF A SWITCH IN WHICH AN EVENT IS REGISTERED | |
| FLOW TABLE ID/ PORT ID | FLOW TABLE IDENTIFIER / PORT IDENTIFIER | IT'S POSSIBLE TO SELECT A SPECIFIC FLOW/PORT OR ALL OF FLOWS/PORTS |
| MSG TYPE | MESSAGE TYPE | EVENT REGISTRATION REQUEST, EVENT OCCURRENCE NOTIFICATION |
| EVENT TYPE | EVENT TYPE WHOSE NOTIFICATION IS REQUESTED | - FLOW (GENERATION/DELETION/ MODIFICATION OF A FLOW, MAX_RATE, MIN_RATE, BYTES, ETC.)<br>- PORT STATUS (UP, DOWN, BYTES, PACKET DROPS, ETC.)<br>- SWITCH STATUS (UP, DOWN, RESTART, SYSTEM ALARM, ETC.) |
| CYCLE | EVENT NOTIFICATION CYCLE | |
| TIME | EVENT REGISTRATION TIME AND OCCURRENCE TIME | |

FIG. 13

| PARAMETER | EXPLANATION | REMARKS |
|---|---|---|
| CONTROLLER ID | IDENTIFIER OF A CONTROLLER REQUESTING EVENT REGISTRATION | MASTER/SLAVE/OTHER CONTROLLER IDENTIFIER |
| SWITCH ID | IDENTIFIER OF A SWITCH IN WHICH AN EVENT IS REGISTERED | |
| TABLE ID | IDENTIFIER OF TABLE | IDENTIFIER OF FLOW/METER/ GROUP TABLE IN WHICH AN EVENT IS TO BE REGISTERED |
| FLOW ENTRY ID | IDENTIFIER OF FLOW ENTRY | IDENTIFIER OF A FLOW ENTRY IN WHICH AN EVENT IS TO BE REGISTERED |
| FLOW MATCHING FIELD | FLOW MATCHING FIELD | FLOW MATCHING CONDITION IN WHICH AN EVENT IS TO BE REGISTERED |
| PORT ID | IDENTIFIER OF PORT | IDENTIFIER OF A PORT IN WHICH AN EVENT IS TO BE REGISTERED |
| MSG | MESSAGE | MESSAGE FOR REQUESTING PAUSE/RESUMPTION/DELETION OF AN EVENT NOTIFICATION |
| MSG TYPE | MESSAGE TYPE | NOTIFICATION REGISTRATION/ PAUSE/RESUMPTION/DELETION REQUEST |
| EVENT TYPE | EVENT TYPE WHOSE NOTIFICATION IS REQUESTED | - EVENT TYPE TO BE NOTIFIED IN FLOW/METER/GROUP TABLE<br>- FLOW(GENERATION/DELETION /MODIFICATION OF A FLOW, MAX_RATE, MIN_RATE, BYTES, ETC.)<br>- PORT STATUS (UP, DOWN, BYTES, PACKET DROPS, ETC.)<br>- SWITCH STATUS (UP, DOWN, RESTART, SYSTEM ALARM, ETC.) |

METHOD FOR PROCESSING EVENT BETWEEN CONTROLLER AND NETWORK DEVICE

TECHNICAL FIELD

The present disclosure relates to a software defined networking technology, and more particularly to a method for processing events between a controller and a network apparatus.

BACKGROUND ART

Currently, standardization on technologies for efficiently operating a communication system by separating a traffic forwarding function and a control function of a switch apparatus is going on in an Open Networking Foundation (ONF), an Internet Engineering Task Force (IETF), a European Telecommunications Standards Institute (ETSI) ISG Network Function Virtualization (NFV), and an International Telecommunications Union Telecommunication (ITU-T).

Software-defined networking (SDN) means a user-oriented network in which a user has control authority regardless of a basic network device such as a router or a switch, etc. and a separate software controller controls a flow of traffic. Therefore, a role of the controller is important in the SDN environment, since a user can control a network through the controller.

Meanwhile, the SDN technology provides methods for separating a control plane which controls data packet forwarding from a physical network, and making the control plane and a data plane interoperate with each other.

However, there are not techniques for the controller to efficiently monitor events occurring in a network apparatus such as a switch, etc.

DISCLOSURE

Technical Problem

The purpose of the present invention for resolving the above-described problem is to provide a method of registering a notification request for an interested event between a switch and a controller, and a method of notifying occurrence of the registered event.

Also, another purpose of the present invention for resolving the above-described problem is to provide a method of controlling a notification request for an interested event between a switch and a controller.

Technical Solution

In order to achieve the above-described purpose of the present invention, a method for processing an event, performed by a network apparatus, according to an aspect of the present invention, may comprise receiving an event notification registration request from a controller; monitoring an occurrence of an event corresponding to the event notification registration request; and when the event occurs, notifying the occurrence of the event to the controller.

Here, the event notification registration request may include a threshold value.

Here, in the notifying the occurrence of the event to the controller, the occurrence of the event may be notified when the threshold value is achieved.

Here, in the receiving the event notification registration request, the event notification registration request may specify an event on a flow or a port.

Also, in the notifying the occurrence of the event to the controller, the occurrence of the event may be notified when a usage amount of the flow exceeds a threshold value.

Also, in the notifying the occurrence of the event to the controller, the occurrence of the event may be notified when a packet drop occurs in the port.

Here, in the receiving the event notification registration request, the event notification registration request may include identification information of the controller, information on an event to be monitored, and information on a notification cycle.

Also, in the notifying the occurrence of the event to the controller, the occurrence of the event may be notified to the controller according to the notification cycle.

In order to achieve the above-described purpose of the present invention, a method for monitoring an event, performed by a controller, according to another aspect of the present invention, may comprise requesting at least one network apparatus to register an event to be notified; receiving a result of the registration of the event to be notified according to the requesting from the at least one network apparatus; and controlling an event notification manner for the event registered in the at least one network apparatus.

Here, the method may further comprise being notified of occurrence of the event by the at least one network apparatus, according to the controlled event notification manner.

Here, the event notification registration request may include a threshold value, and an occurrence of the event may be notified by the at least one network apparatus when the threshold value is achieved.

Also, the occurrence of the event may be notified when a usage amount of a flow exceeds the threshold value.

Here, in the controlling the event notification manner, the controller may control the at least one network apparatus to perform at least one of pause, resumption, and deletion of the event registered in the at least one network apparatus.

In order to achieve the above-described purpose of the present invention, a computer-readable recording medium storing a program for executing a method for monitoring an event by a processor, according to yet another aspect of the present invention, may comprise generating an event notification registration request command for requesting a network apparatus to notify an occurrence of an event; generating a command for controlling an event notification manner of the network apparatus; and being notified of the occurrence of the event by the network apparatus based on the event notification registration request command and the command for controlling the event notification manner.

Here, the method may further comprise transmitting the event notification registration request command and the command for controlling the event notification manner to the network apparatus.

Here, the event notification registration request may include a threshold value, and the occurrence of the event may be notified to the controller by the network apparatus when the threshold value is achieved.

Here, the command for controlling the event notification manner may include at least one of pause, resumption, and deletion of notification of the event.

Advantageous Effects

Using the above-described methods and apparatuses for processing network events according to exemplary embodiments of the present invention, a controller may register an interested event to be notified in a switch, and make the switch notify the event to the controller when the event occurs. Thus, the controller may reduce work-load of the switch and the controller by reducing the number of messages transmitted for monitoring events in the switch.

Also, methods for pause, resumption, and deletion of registered event notification requests are proposed, such that the controller can reduce its work-load by reducing the number of messages transmitted for monitoring events in the switch, and the controller and the switch can operate dynamically according to situations.

DESCRIPTION OF DRAWINGS

FIG. 5 is a sequence chart to explain a method for processing an event when a notification cycle is configured according to an exemplary embodiment of the present invention.

FIG. 6 is a table to explain examples of parameters used for performing registration of event notifications according to an exemplary embodiment of the present invention.

FIG. 13 is a table to explain examples of parameters used for controlling notifications of registered events according to an exemplary embodiment of the present invention.

BEST MODE

Figure 1:
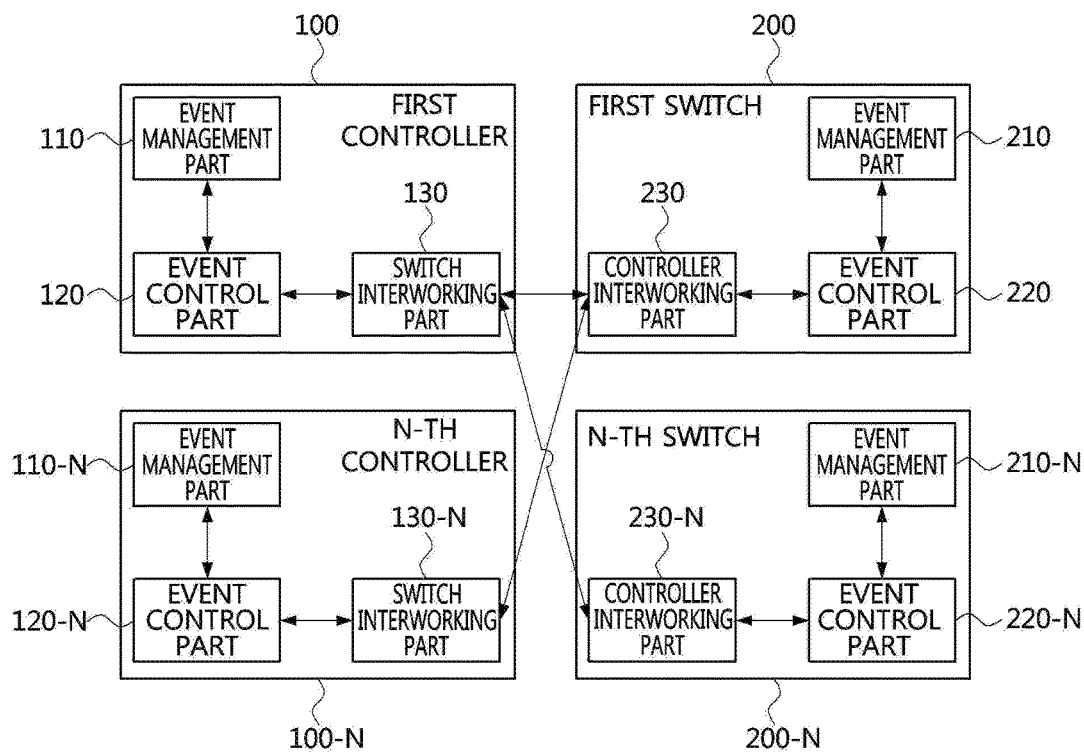
FIG. 1 is a block diagram to explain a configuration of a system comprising controllers and switches according to an exemplary embodiment of the present invention.

While the invention is susceptible to various modifications and alternative forms, specific embodiments thereof are shown by way of examples in the drawings and will herein be described in detail. It should be understood, however, that there is no intent to limit the invention to the particular forms disclosed, but on the contrary, the invention is meant to cover all modifications, equivalents, and alternatives falling within the spirit and scope of the invention Like numbers refer to like elements in the accompanying drawings.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, it will be understood that when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a 'controller' in the specification means a functional entity controlling related components (for example, switches, routers, etc.) in order to control flows of traffic.

Also, the controller is not restricted to a specific physical implementation or a specific implementation position. For example, the controller may mean a controller functional entity defined in ONF, IETF, ETSI, or ITU-T.

A 'network apparatus' in the specification means a functional entity performing traffic (or, packet) forwarding, switching, or routing. Accordingly, in the specification, the network apparatus may also be referred to as a 'switch' or 'router'.

For example, the network apparatus may mean a switch, a router, a switching element, a routing element, a forwarding element, etc. defined in ONF, IETF, ETSI, or ITU-T.

Various parameters and/or messages defined for explanation on methods for processing events between a controller and a network apparatus are not limited to specific parameter and/or messages in the exemplary embodiments of the present invention.

Hereinafter, preferred exemplary embodiments according to the present invention will be explained in detail by referring to accompanying figures.

FIG. 1 is a block diagram to explain a configuration of a system comprising controllers and switches according to an exemplary embodiment of the present invention.

Referring to FIG. 1, a system for providing a procedure of identifying connection status between controllers and switches, according to the present invention, may comprise a plurality of controllers 100 to 100-*n* and a plurality of switches 200 to 200-*n*.

Here, the controllers 100 to 100-*n* may respectively comprise event management parts 110 to 110-*n*, event control parts 120 to 120-*n*, and switch interworking parts 130 to 130-*n*.

The event management parts 110 to 110-*n* may request registration of events to be notified to the event control parts 120 to 120*n*, and manage the events to be notified when the events occur.

The event control parts 120 to 120-*n* may receive the requests of the event management part 110 to 110-*n*, transfer messages for requesting registration of interested events to the switches 200 to 200-*n*, and transmit response messages in response to notification of event occurrence transferred from the switches 200 to 200-*n*.

The switch interworking parts 130 to 130-*n* may perform protocol control in order to communicate with the switches 200 to 200-*n*.

Also, the switches 200 to 200-*n* may respectively comprise event management parts 210 to 210-*n*, event control parts 220 to 220-*n*, and controller interworking parts 230 to 230-*n*.

The event management parts 210 to 210-*n* may manage events notifications of which the controllers 100 to 100-*n* requested, and events to be notified to the controllers 100 to 100-*n* through event monitoring.

The event control parts 220 to 220-*n* may receive requests of the event management parts 210 to 210-*n*, transfer event occurrence notification messages to the controllers 100 to 100-*n* through the controller interworking parts 230 to 230-*n*, and transmit, to the controllers 100 to 100-*n*, response messages in response to the event notification registration requests transferred from the controllers 100 to 100-*n*.

Figure 2:
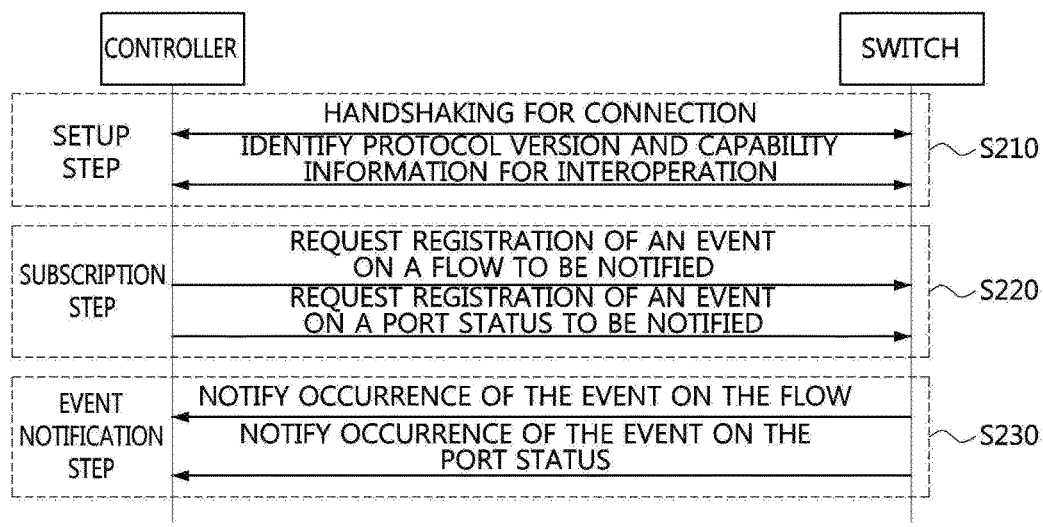
FIG. 2 is a sequence chart to explain a procedure for processing events between a controller and a switch according to an exemplary embodiment of the present invention.

FIG. 2 is a sequence chart to explain a procedure for processing events between a controller and a switch according to an exemplary embodiment of the present invention.

Referring to FIG. 2, the controller may request the switch to register an event to be notified in order to receive a notification when the event occurs, and the switch may notify occurrence of the event to the controller when the corresponding event occurs.

The procedure may be explained as separated into a setup step S210, a subscription step S220, and an event notification step S230.

First, in the setup step S210, a connection between the controller and the switch may be established. For example, the controller and the switch may complete configuration of the connection through a handshaking procedure. Here, for the configuration of the connection, transport layer protocols such as TCP/IP, which make mutual communications between the controller and the switch possible, may be used.

Also, the controller and the switch may complete negotiation by identifying protocol version and capability information of each other.

Second, in the subscription step S220, registration of an event to be notified may be performed. For example, the controller may transmit, to the switch, a notification registration request message for an event to occur in a flow of the switch. Also, the controller may transmit, to the switch, a notification registration request message for an event corresponding to a port status change of the switch.

Lastly, in the event notification step S230, when the event corresponding to the flow which the controller registered occurs, the switch may transmit an event occurrence notification message to the controller. Also, when a port status change event occurs in the port whose status change notification was requested by the controller, the switch may transmit an event occurrence notification message to the controller.

Here, the message, which the controller transmits to the switch in order to request registration of the event to be notified, may include various parameters such as information on the event notification of which is requested, notification cycle for periodical notification, a threshold values of the number of occurrences or amount related the event, etc. Also, the message for requesting registration of the event to be notified may be constructed in various ways as including parameter values, package values, or scripts.

Figure 3:
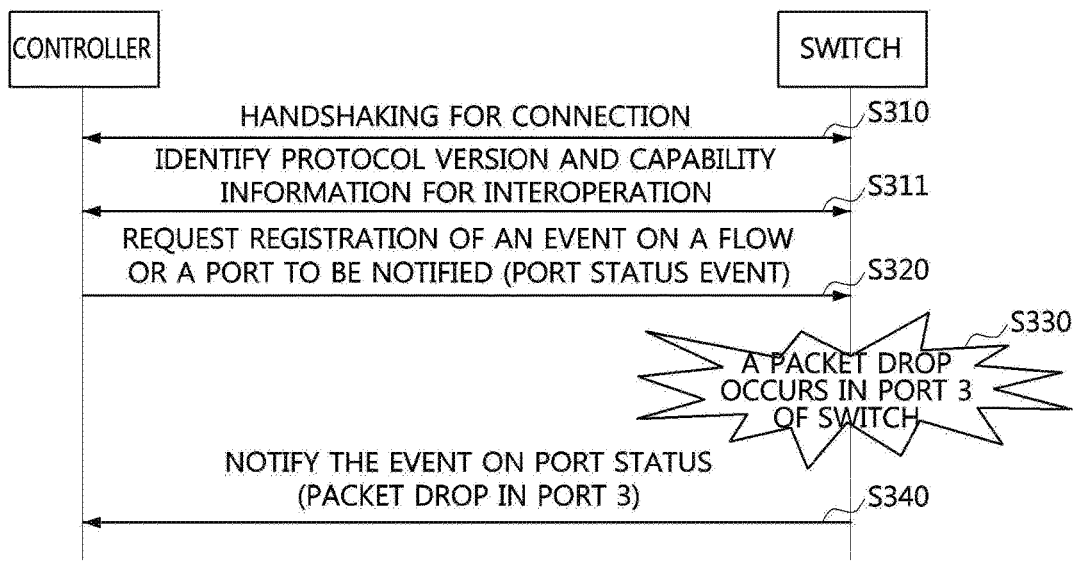
FIG. 3 is a sequence chart to explain a method for processing an event when the event occurs in a specific port according to an exemplary embodiment of the present invention.

FIG. 3 is a sequence chart to explain a method for processing an event when the event occurs in a specific port according to an exemplary embodiment of the present invention.

Referring to FIG. 3, the controller and the switch may complete configuration of connection through a handshaking procedure (S310). Here, for the configuration of the connection, transport layer protocols such as TCP/IP, which make mutual communications between the controller and the switch possible, may be used.

Also, the controller and the switch may complete negotiation by identifying protocol version and capability information of each other (S311).

The controller may transmit a notification registration request message for an event to occur in a flow or a port to the switch (S320). For example, the controller may request registration of an event for a port status change.

The switch may monitor statuses of internal ports. When an occurrence of the event (e.g. a packet loss in a port 3 of the switch) is detected (S330), the switch may transmit an event occurrence notification message to the controller (S340).

Figure 4:
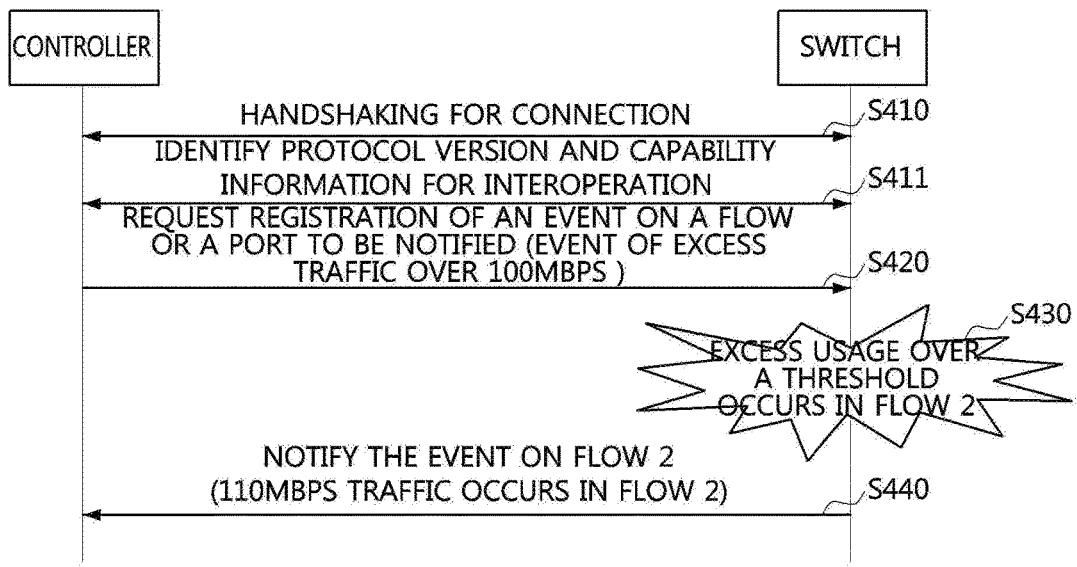
FIG. 4 is a sequence chart to explain a method for processing an event when the event occurs in a specific flow according to an exemplary embodiment of the present invention.

FIG. 4 is a sequence chart to explain a method for processing an event when the event occurs in a specific flow according to an exemplary embodiment of the present invention.

Referring to FIG. 4, the controller and the switch may complete configuration of connection through a handshaking procedure (S410). Here, for the configuration of the connection, transport layer protocols such as TCP/IP, which make mutual communications between the controller and the switch possible, may be used.

Also, the controller and the switch may complete negotiation by identifying protocol version and capability information of each other (S411).

The controller may transmit a notification registration request message for an event to occur in a flow or a port to the switch (S420). For example, the controller may request registration of an event for a case that traffic more than a threshold (e.g. 100 Mbps) occurs in a specific flow.

The switch may monitor traffic amounts of internal flows. When it is detected that traffic more than the threshold occurs in a specific flow (e.g. flow 2) (S430), the switch may transmit an event occurrence notification message, notifying that the flow 2 has used traffic more than the threshold, to the controller (S440).

FIG. 5 is a sequence chart to explain a method for processing an event when a notification cycle is configured according to an exemplary embodiment of the present invention.

Referring to FIG. 5, the controller and the switch may complete configuration of connection through a handshaking procedure (S510). Here, for the configuration of the connection, transport layer protocols such as TCP/IP, which make mutual communications between the controller and the switch possible, may be used.

Also, the controller and the switch may complete negotiation by identifying protocol version and capability information of each other (S511).

The controller may transmit an event notification registration request message for an event to occur in a flow or an event for status change in a port to the switch (S520).

For example, the controller may transmit a message for requesting registration of an event to be notified as including information on a port status to be monitored, a threshold of usage amount of a flow, notification cycle (Tp), etc. to the switch. In this case, the switch may monitor its port status or usage amount of the flow. When a corresponding event occurs, the switch may transmit an event occurrence notification message to the controller based on the notification cycle (Tp) (S530, S540).

FIG. 6 is a table to explain examples of parameters used for performing registration of event notifications according to an exemplary embodiment of the present invention.

Referring to FIG. 6, a method for performing registration of event notifications according to an exemplary embodiment of the present invention will be explained as follows.

The controller may request the network apparatus to register an event to be notified. Here, a message for requesting registration of the event notification may include information such as an event registration request message identifier (Msg_id), an identifier of the controller (Controller id), an identifier of the switch (Switch id), a flow table identifier or a port identifier (Flow Table id/Port id), an event type whose notification is requested (Event type), an event notification cycle, etc.

That is, the controller may request registration of the event notification by transmitting identification information of the controller, information on the event which is a target of the notification, and information on notification cycle to the network apparatus.

The network apparatus may monitor occurrences of the event corresponding to the registered event notification request.

When the corresponding event occurs, the network apparatus may transmit an event occurrence notification message to the controller.

For example, when usage amount of a flow which is a notification target exceeds a predetermined threshold, the switch may perform event occurrence notification to the controller. Also, when packet drops occur in a port which is a notification target, the switch may perform event occurrence notification to the controller.

Also, when an event whose notification is requested occurs, the switch may perform event occurrence notification to the controller which requested notification of the event according to the notification cycle.

Figure 7:
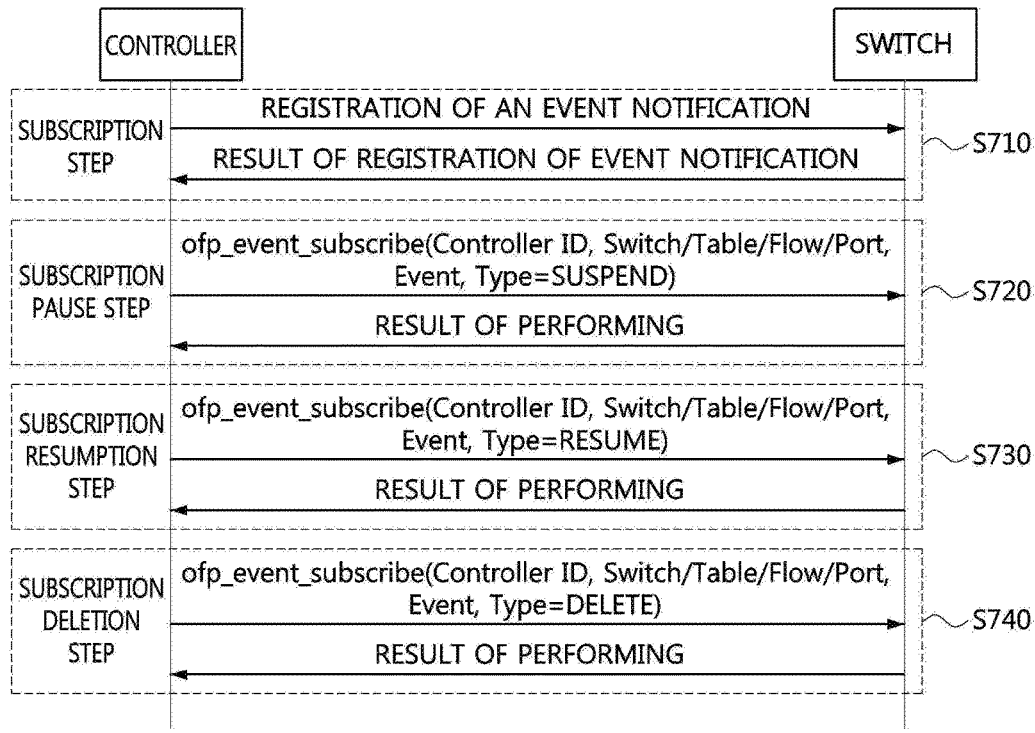
FIG. 7 is a sequence chart to explain a method for processing events by controlling registered events according to an exemplary embodiment of the present invention.

FIG. 7 is a sequence chart to explain a method for processing events by controlling registered events according to an exemplary embodiment of the present invention.

The controller may transmit a message for requesting registration, pause, resumption, or deletion of an event notification, including identifiers of the controller, the switch, the table, the flow, and the event, to the switch.

In this case, identifiers of all controllers such as a master controller, and back-up slave controllers, which need to receive the corresponding event notification, may be used.

Also, the concept of pause, resumption, and deletion may also be applied to messages exchanged between the controller and the switch in addition to the event notifications. Also, the message for requesting registration of the event to be notified may be constructed in various ways as including parameter values, package values, or scripts.

Referring to FIG. 7, a method for processing events by controlling event notifications registered in a network apparatus may be explained as separated into a subscription step S710, a subscription pause step S720, a subscription resumption step S730, and a subscription deletion step S740.

According to the subscription step S710, after configuration of a connection between the controller and the switch is completed, the controller may request registration of an event notification, and the switch may respond to the controller with a result of the requested registration of the event notification.

According to the subscription pause step S720, the controller may request pause of the notification for the registered event to the switch. That is, the requesting pause of the event notification may be possible for various cases such as an operation stop of the controller due to necessity of operation and a fail-over using a slave controller.

According to the subscription resumption step S730, the controller may request the switch to resume the event notification which was paused, and the switch may respond to the request.

According to the subscription deletion step S740, the controller may transmit a notification deletion request message for the registered event to the switch when the notification of the registered event is not further necessary, and the switch may respond to the request message.

Figure 8:
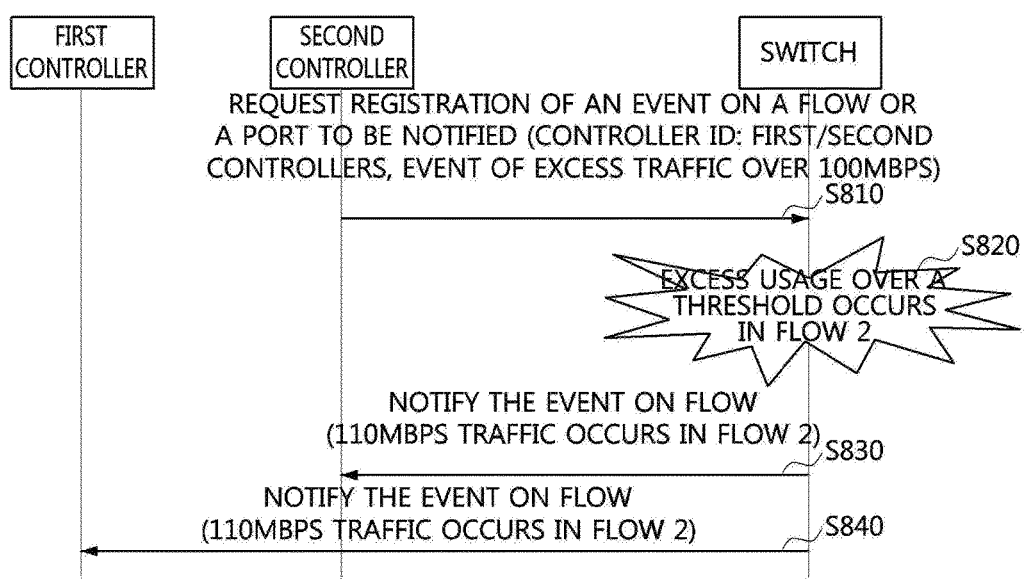
FIG. 8 is a sequence chart to explain a method for notifying occurrence of an event to multiple controllers according to an exemplary embodiment of the present invention.

FIG. 8 is a sequence chart to explain a method for notifying occurrence of an event to multiple controllers according to an exemplary embodiment of the present invention.

Referring to FIG. 8, the controller may request registration of an event to be notified when a usage amount of a specific flow exceeds a threshold (S810).

For example, a first controller may transmit, to a switch, an event registration request message which requests the switch to notify an event occurrence to the first controller and a second controller when a usage amount exceeds 100 Mbps.

Then, the switch may monitor usage amounts of respective flows. When it is detected that a flow (e.g. flow 2) uses traffic more than a threshold (e.g. 100 Mbps) (S820), the switch may transmit an event occurrence notification message notifying the first controller of that the flow (e.g. flow 2) uses traffic more than the threshold (S830).

Also, the switch may also transmit an event occurrence notification message notifying the second controller of that the flow (e.g. flow 2) uses traffic more than threshold (S840).

Figure 9:
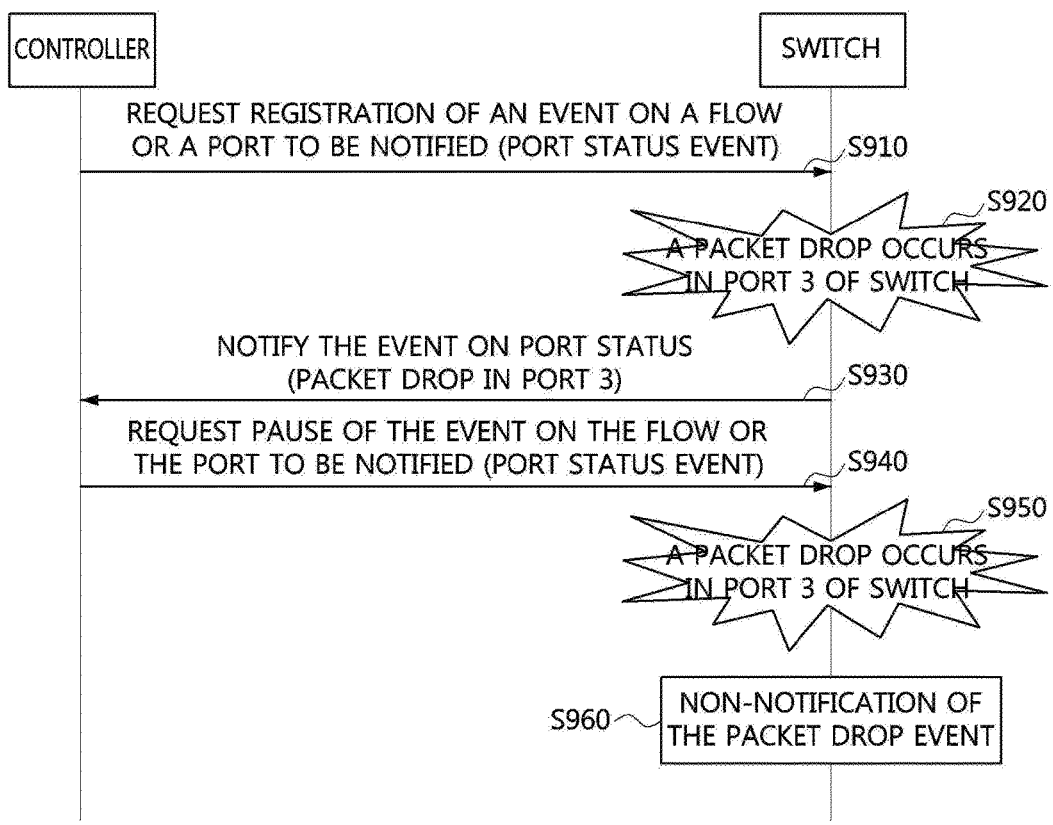
FIG. 9 is a sequence chart to explain a method for processing a registered event, when a notification of the registered event is paused, according to an exemplary embodiment of the present invention.

FIG. 9 is a sequence chart to explain a method for processing a registered event, when a notification of the registered event is paused, according to an exemplary embodiment of the present invention.

Referring to FIG. 9, the controller may transmit an event notification registration request message for an event on a port status to the switch (S910).

The switch may monitor a status of an internal port. When a packet loss is detected in a port (e.g. a port 3) of the switch (S920), the switch may transmit, to the controller, an event occurrence notification message notifying the switch of that a packet loss occurs in the port 3 (S930).

The controller may transmit a notification pause request message for the registered event on the port status to the switch (S940).

In this case, even if a packet loss in the port 3 of the switch is detected while the switch is monitoring the port status, the switch may not notify the event occurrence to the controller (S960).

Figure 10:
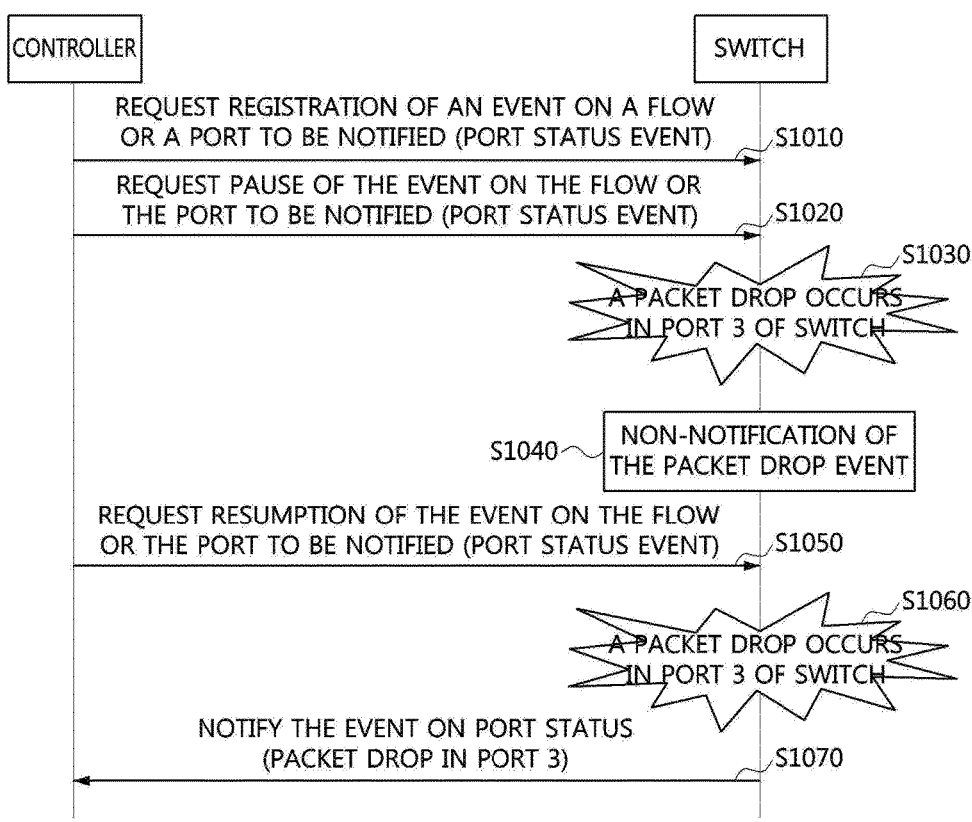
FIG. 10 is a sequence chart to explain a method for processing a registered event, when the notification of the registered event is paused or resumed, according to an exemplary embodiment of the present invention.

FIG. 10 is a sequence chart to explain a method for processing a registered event, when the notification of the registered event is paused or resumed, according to an exemplary embodiment of the present invention.

Referring to FIG. 10, the controller may transmit a notification registration request message for an event on a port status to the switch (S1010).

The controller may transmit a notification pause request message for the registered event on the port status to the switch (S1020).

After then, even if a packet loss in a port (e.g. a port 3) of the switch is detected while the switch is monitoring the port status (S1030), the switch may not notify the event occurrence to the controller (S1040).

The controller may transmit a notification resumption request message for an event on a port status to the switch (S1050).

If a packet loss in the port 3 of the switch is detected while the switch is monitoring the port status (S1060), the switch may transmit an event occurrence notification message informing the controller of that the packet loss occurs in the port 3 of the switch (S1070).

Figure 11:
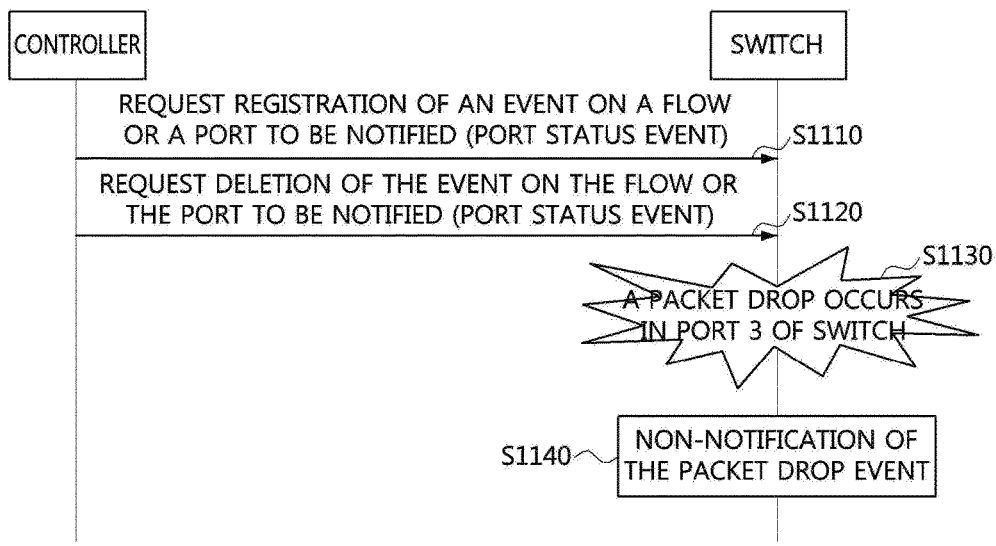
FIG. 11 is a sequence chart to explain a method for processing a registered event, when the registered event notification is deleted, according to an exemplary embodiment of the present invention.

FIG. 11 is a sequence chart to explain a method for processing a registered event, when the registered event notification is deleted, according to an exemplary embodiment of the present invention.

Referring to FIG. 11, the controller may transmit an event notification registration request message for an event on a port status to the switch (S1110).

When necessary, the controller may transmit an event notification deletion request message for the event on the port status to the switch (S1120).

Even if a packet loss in a port (e.g. a port 3) of the switch is detected while the switch is monitoring the port (S1130), the switch may not notify the occurrence of the event to the controller (S1140). In this case, since the event notification is deleted according to the request message for deleting the event notification, the notification cannot be resumed even by using an event notification resumption request message. That is, a registration of the event notification should be requested to the switch again.

Figure 12:
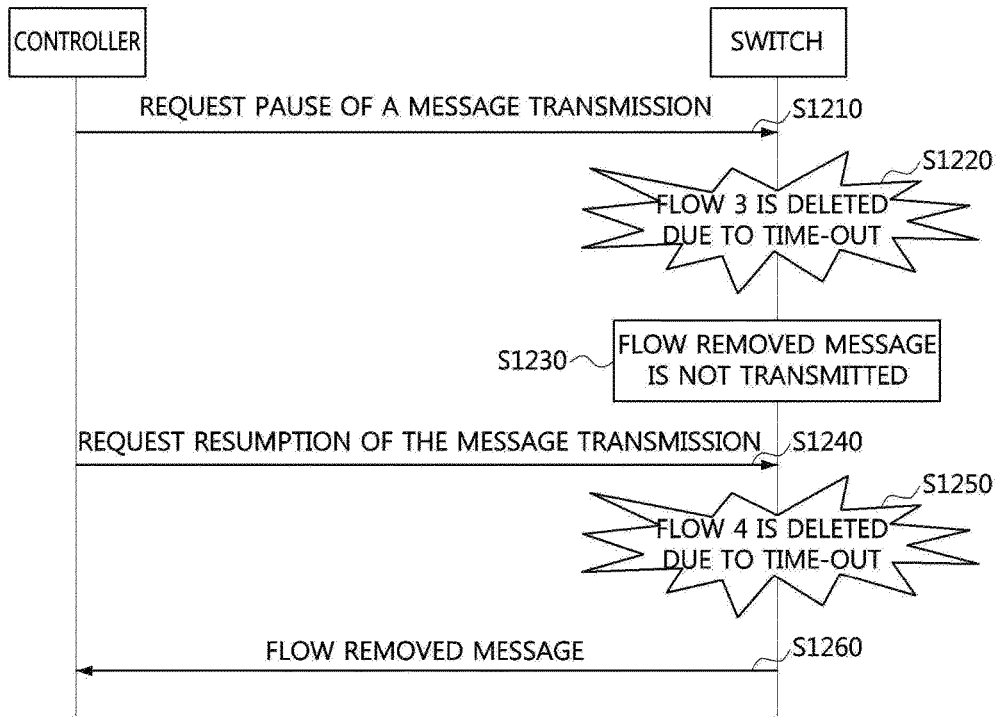
FIG. 12 is a sequence chart to explain a method for processing a registered event, when the registered event notification is paused or resumed, according to an exemplary embodiment of the present invention.

FIG. 12 is a sequence chart to explain a method for processing a registered event, when the registered event notification is paused or resumed, according to an exemplary embodiment of the present invention.

Referring to FIG. 12, the controller may transmit a pause request message for a specific message transmission to the switch (S1210). For example, the controller may transmit a pause request message to the switch in order to make an event message not being transmitted to the controller even when a specific flow times out.

Even if an idle time-out occurs in the flow 3 of the switch, the switch may not transmit a 'flow removed message' to the controller (S1230).

Also, the controller may transmit a resumption request message for the specific message transmission to the switch (S1240).

When the switch detects an idle time-out in a flow 4, the switch may transmit a 'flow removed message' to the controller (S1260).

FIG. 13 is a table to explain examples of parameters used for controlling notifications of registered events according to an exemplary embodiment of the present invention.

Referring to FIG. 13, procedures according to FIGS. 7 to 12 will be explained as follows.

The controller may request registration of an event notification to the network apparatus. That is, the controller may request the network apparatus to notify an event to the controller when the event occurs in a specific notification-target flow or a specific notification-target port.

Here, a message for requesting the registration of the event notification may include identification information of the controller requesting the registration, information on the event to be notified, and information on notification cycle.

More specifically, the parameters presented in FIG. 13 may be utilized for registration of the event notification.

For example, parameters such as an identifier of the controller requesting registration of event notification (Controller id), an identifier of the switch in which the event notification is to be registered (Switch id), an identifier of a flow entry (Flow entry id), an identifier of a port (Port id), an event type to be notified, etc. may be utilized.

The network apparatus may inform the controller of a result of the event notification registration according to the event notification registration request.

The controller may control the event notification registered in the network apparatus based on the result of the event notification registration.

Specifically, the controller may control the network apparatus to perform at least one of pause, resumption, and deletion of the registered event notification.

When the network apparatus is controlled to pause the registered event notification, the network apparatus may stop its event notification temporally.

Also, when the network apparatus is controlled to resume the registered event notification, the network apparatus may resume the stopped event notification.

Furthermore, when the network apparatus is controlled to delete the registered event notification, the network apparatus may delete the registered event notification.

The methods for processing network events according to exemplary embodiments of the present invention may be implemented in a computer-readable recording medium as a program or codes which a computer can read out. The computer-readable recording medium may include all kinds of storage apparatuses in which data are stored. Also, in the computer-readable recording medium, a program or codes, which a computer can read out, may be stored and executed in a distributed manner.

Using the above-described methods and apparatuses for processing network events according to exemplary embodiments of the present invention, a controller may register interested events in a switch and make the switch notify the event to the controller when the event occurs. Thus, the controller may reduce work-load of the switch and the controller by reducing the number of messages transmitted for monitoring events in the switch.

Also, methods for pause, resumption, and deletion of registered event notification requests are proposed such that the controller can reduce its work-load by reducing the number of messages transmitted for monitoring events in the switch, and the controller and the switch can operate dynamically according to situations.

While the example embodiments of the present invention and their advantages have been described in detail, it should be understood that various changes, substitutions and alterations may be made herein without departing from the scope of the invention.

The invention claimed is:

1. A method for processing an event, performed by a network apparatus, the method comprising:
   receiving an event notification registration request from a controller;
   monitoring an occurrence of an event corresponding to the event notification registration request, the event occurring at the network apparatus;
   when the event occurs, notifying the occurrence of the event to the controller; and
   performing at least one of pause, resumption, and deletion of a notification of the event corresponding to the event notification registration request;
   in response to performing the pause of the notification of the event registered in the at least one network apparatus, refraining from notifying the controller of an occurrence of the event to be notified; and
   in response to performing the resumption of the notification of the event registered in the at least one network apparatus, resuming notifying the controller of the occurrence of the event to be notified,
   wherein the network apparatus includes one of a switch and a router.

2. The method according to claim 1, wherein the event notification registration request includes a threshold value.

3. The method according to claim 2, wherein, in the notifying the occurrence of the event to the controller, the occurrence of the event is notified when the threshold value is achieved.

4. The method according to claim 1, wherein, in the receiving the event notification registration request, the event notification registration request specifies an event on a flow or a port.

5. The method according to claim 4, wherein, in the notifying the occurrence of the event to the controller, the occurrence of the event is notified when a usage amount of the flow exceeds a threshold value.

6. The method according to claim 4, wherein, in the notifying the occurrence of the event to the controller, the occurrence of the event is notified when a packet drop occurs in the port.

7. The method according to claim 1, wherein, in the receiving the event notification registration request, the event notification registration request includes identification information of the controller, information on an event to be monitored, and information on a notification cycle.

8. The method according to claim 7, wherein, in the notifying the occurrence of the event to the controller, the occurrence of the event is notified to the controller according to the notification cycle.

9. A method for monitoring an event, performed by a controller, the method comprising:
   requesting at least one network apparatus to register an event to be notified, the event to be notified occurring at the at least one network apparatus;
   receiving a result of the registration of the event to be notified according to the requesting from the at least one network apparatus; and
   controlling an event notification manner for the event registered in the at least one network apparatus,
   wherein the network apparatus includes one of a switch and a router, and
   wherein, in the controlling the event notification manner, the controller controls the at least one network apparatus to perform at least one of pause, resumption, and deletion of a notification of the event registered in the at least one network apparatus, and
   wherein the at least one network apparatus is configured to, in response to performing the deletion of the notification of the event registered in the at least one network apparatus, delete the event registered in the at least one network apparatus and refrain from notifying the controller of an occurrence of the event to be notified.

10. The method according to claim 9, further comprising being notified of occurrence of the event by the at least one network apparatus, according to the controlled event notification manner.

11. The method according to claim 9, wherein the event notification registration request includes a threshold value, and an occurrence of the event is notified by the at least one network apparatus when the threshold value is achieved.

12. The method according to claim 11, wherein the occurrence of the event is notified when a usage amount of a flow exceeds the threshold value.

13. A method for processing an event, performed by a network apparatus, the method comprising:
   receiving an event notification registration request from a controller;
   monitoring an occurrence of an event corresponding to the event notification registration request, the event occurring at the network apparatus;
   when the event occurs, notifying the occurrence of the event to the controller;
   performing at least one of pause, resumption, and deletion of a notification of the event corresponding to the event notification registration request; and
   in response to performing the deletion of the notification of the event registered in the at least one network apparatus, deleting the event registered in the at least one network apparatus and refraining from notifying the controller of an occurrence of the event to be notified,
   wherein the network apparatus includes one of a switch and a router.

14. The method according to claim 13, wherein the event notification registration request includes a threshold value.

15. The method according to claim 14, wherein, in the notifying the occurrence of the event to the controller, the occurrence of the event is notified when the threshold value is achieved.

16. The method according to claim 1, wherein, in the receiving the event notification registration request, the event notification registration request specifies an event corresponding to a port status change of the network apparatus.

17. The method according to claim 1, wherein, in the receiving the event notification registration request, the event notification registration request specifies an event corresponding to a traffic flow of the one of the switch and the router exceeding a threshold value.

18. The method according to claim 1, further comprising:
   when the event occurs, notifying the occurrence of the event to a second controller different from the controller.

19. The method according to claim 13, wherein, in the receiving the event notification registration request, the event notification registration request includes identification information of the controller, information on an event to be monitored, and information on a notification cycle.

20. The method according to claim 19, wherein, in the notifying the occurrence of the event to the controller the occurrence of the event is notified to the controller according to the notification cycle.

21. The method according to claim 13, wherein, in the receiving the event notification registration request, the event notification registration request specifies an event on a flow or a port.

22. The method according to claim 21, wherein, in the notifying the occurrence of the event to the controller, the occurrence of the event is notified when a usage amount of the flow exceeds a threshold value.

23. The method according to claim 21, wherein, in the notifying the occurrence of the event to the controller, the occurrence of the event is notified when a packet drop occurs in the port.

* * * * *